United States Patent
Chen et al.

(10) Patent No.: US 11,635,743 B2
(45) Date of Patent: Apr. 25, 2023

(54) PARAMETERS SUGGESTION SYSTEM OF SOLDER PASTE SCREEN PRINTER INCLUDING METHOD, DEVICE EMPLOYING METHOD, AND NON-TRANSITORY STORAGE

(71) Applicant: Fulian Precision Electronics (Tianjin) Co., LTD., Tianjin (CN)

(72) Inventors: Yi-Ru Chen, New Taipei (TW); Han-Ting Hsu, New Taipei (TW); Hsueh-Fang Ai, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 388 days.

(21) Appl. No.: 16/910,355

(22) Filed: Jun. 24, 2020

(65) Prior Publication Data

US 2021/0149363 A1    May 20, 2021

(30) Foreign Application Priority Data

Nov. 14, 2019   (CN) .......................... 201911114990.0

(51) Int. Cl.
```
G05B 19/18      (2006.01)
B23K 3/08       (2006.01)
G06F 16/22      (2019.01)
G06N 20/00      (2019.01)
```
(52) U.S. Cl.
CPC .............. *G05B 19/188* (2013.01); *B23K 3/08* (2013.01); *G06F 16/22* (2019.01); *G06N 20/00* (2019.01); *G05B 2219/45026* (2013.01)

(58) Field of Classification Search
CPC ............ G06F 16/22; G06N 20/00; B23K 3/08

USPC ......................................................... 700/121
See application file for complete search history.

(56) References Cited

U.S. PATENT DOCUMENTS

| | | | | |
|---|---|---|---|---|
| 2019/0195939 A1* | 6/2019 | Noh | ....................... | G01R 31/28 |
| 2019/0269017 A1* | 8/2019 | Lee | ........................ | G06F 30/27 |
| 2019/0362482 A1* | 11/2019 | Han | ........................ | G06N 20/00 |
| 2020/0082278 A1* | 3/2020 | Wu | ........................ | B23K 3/00 |
| 2020/0292471 A1* | 9/2020 | Xia | ........................ | G06T 7/001 |
| 2021/0357693 A1* | 11/2021 | Kim | .................... | H05K 13/0817 |

FOREIGN PATENT DOCUMENTS

TW          I676939          11/2019

\* cited by examiner

*Primary Examiner* — Md Azad
(74) *Attorney, Agent, or Firm* — ScienBiziP, P.C.

(57) ABSTRACT

A method to set up the parameters of solder paste screen printer while in a new product introduction (NPI). The method includes establishing a solder-printing database of a predetermined product and a database of different specifications of products, and training a first prediction model by reference to a solder paste screen printer (SPSP) and a solder paste inspection (SPI) based on the solder-printing database. A second prediction model is trained by reference to the SPI based on the database of different products. The method further includes predicting parameters for products with different specifications under multiple sets of printing parameters based on the first and second prediction models. An objective function based on the predicted measurements is established, and a specification of a product and a printing expectation parameters are input to the objective function for outputting many sets of printing-suggestion parameters of the new product.

16 Claims, 4 Drawing Sheets

PARAMETERS SUGGESTION SYSTEM OF SOLDER PASTE SCREEN PRINTER INCLUDING METHOD, DEVICE EMPLOYING METHOD, AND NON-TRANSITORY STORAGE

FIELD

The subject matter herein generally relates to printed circuit board (PCB) manufacturing.

BACKGROUND

When the surface mount technology (SMT) process is performed, the solder paste screen printer (SPSP) may need to be set to different printing parameters to meet the quality required by the product. The decision of printing parameters traditionally is that the placement engineer selects several combinations of printing parameters for a trial printing based on his own experience, and adjusts the printing parameters of the SPSP to determine optimum printing parameters for a new product by trial and error. The cost of such trial and error usually includes a lot of time and money during the NPI.

Thus, there is room for improvement.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
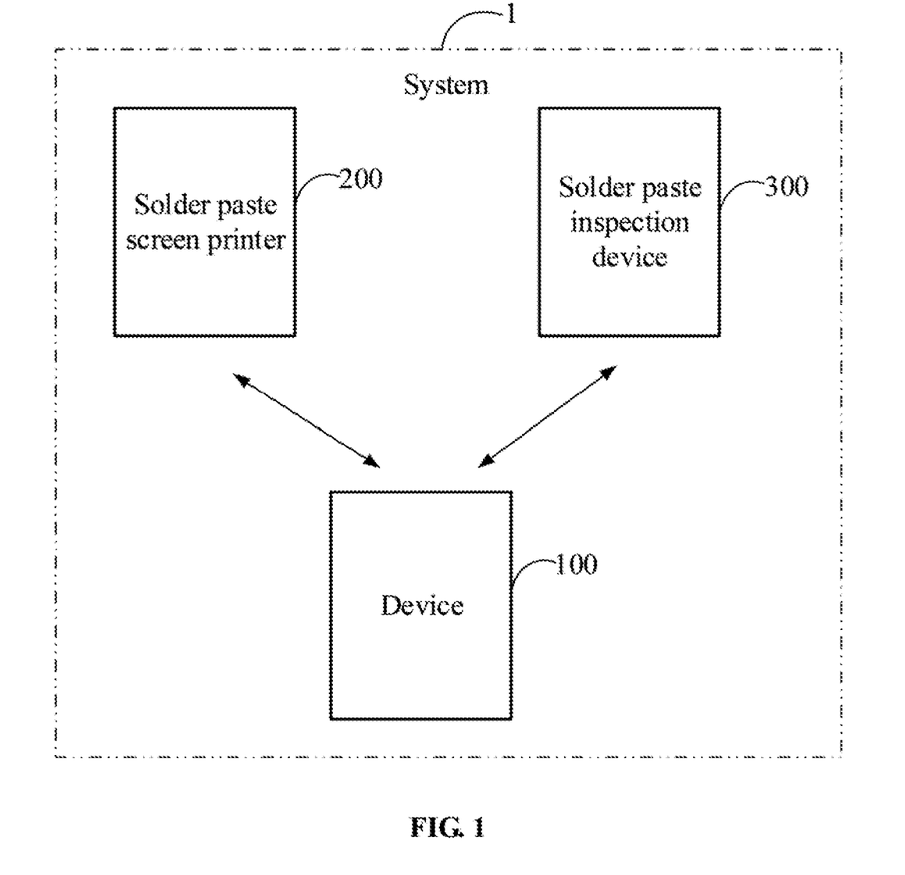
FIG. 1 is a block diagram of an embodiment of a system for deciding product printing parameters in a design of a product requiring soldering.

FIG. 1 illustrates a system for deciding product printing parameters (system 1) in one embodiment. The system 1 can comprise a device (device 100) for deciding product printing parameters, a solder paste screen printer (SPSP 200), and a solder paste inspection device (SPI 300). The SPSP 200 is configured to print solder paste on a printed circuit board (PCB) to solder electronic parts on the PCB. The SPI 300 is configured to measure a quality of the printed solder paste, such as a height of the printing, a printed area, and a volume of the printed solder paste. The device 100 is configured to obtain optimal initial printing parameters of the SPSP 200 in a new product introduction (NPI) stage, and then perform a micro-adjustment based on inspection data of the SPI 300. The device 100 can reduce NPI import time and decrease the trial and error process, and the device 100 can save much time, and speed up realizing the new product mass manufacture.

In one embodiment, the device 100 can communicate with the SPSP 200 and the SPI 300 through wired communication or wireless communication.

In one embodiment, the device 100 can be partially integrated into the SPSP 200 and partially integrated into the SPI 300.

Figure 2:
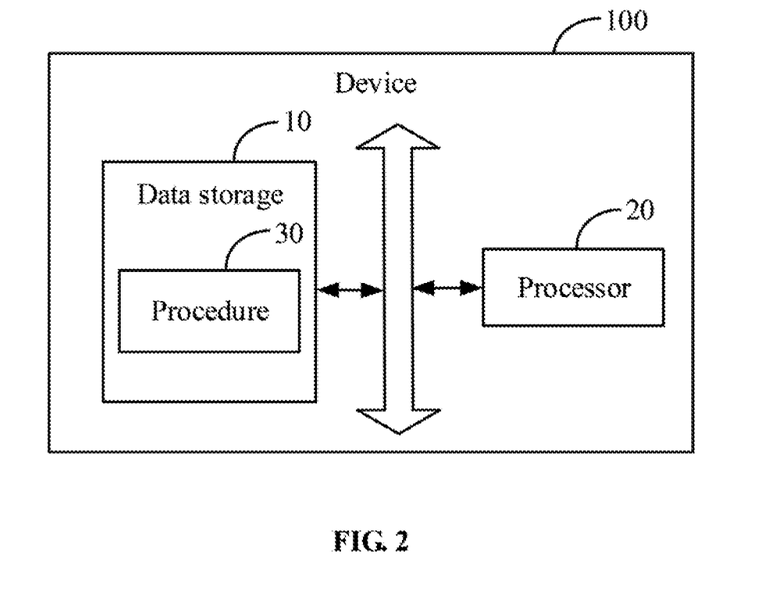
FIG. 2 is a block diagram of an embodiment of a device for deciding product printing parameters of the system of FIG. 1.

Referring to FIG. 2, the device 100 can comprise at least one data storage 10, at least one processor 20, and a procedure for deciding product printing parameters (procedure 30). The procedure 30 may comprise a plurality of computerized codes, the plurality of computerized codes may include commands that can be executed by the processor 20.

In one embodiment, the device 100 can be a computer or a server. The device 100 can further comprise a display device, a network access device, and communication buses.

In one embodiment, the data storage 10 can be in the device 100, or can be a separate external memory card, such as an SM card (Smart Media Card), an SD card (Secure Digital Card), or the like. The data storage 10 can include various types of non-transitory computer-readable storage mediums. For example, the data storage 10 can be an internal storage system, such as a flash memory, a random access memory (RAM) for temporary storage of information, and/or a read-only memory (ROM) for permanent storage of information. The data storage 10 can also be an external storage system, such as a hard disk, a storage card, or a data storage medium. The processor 20 can be a central processing unit (CPU), a microprocessor, or other data processor chip that performs functions of the device 100.

Figure 3:
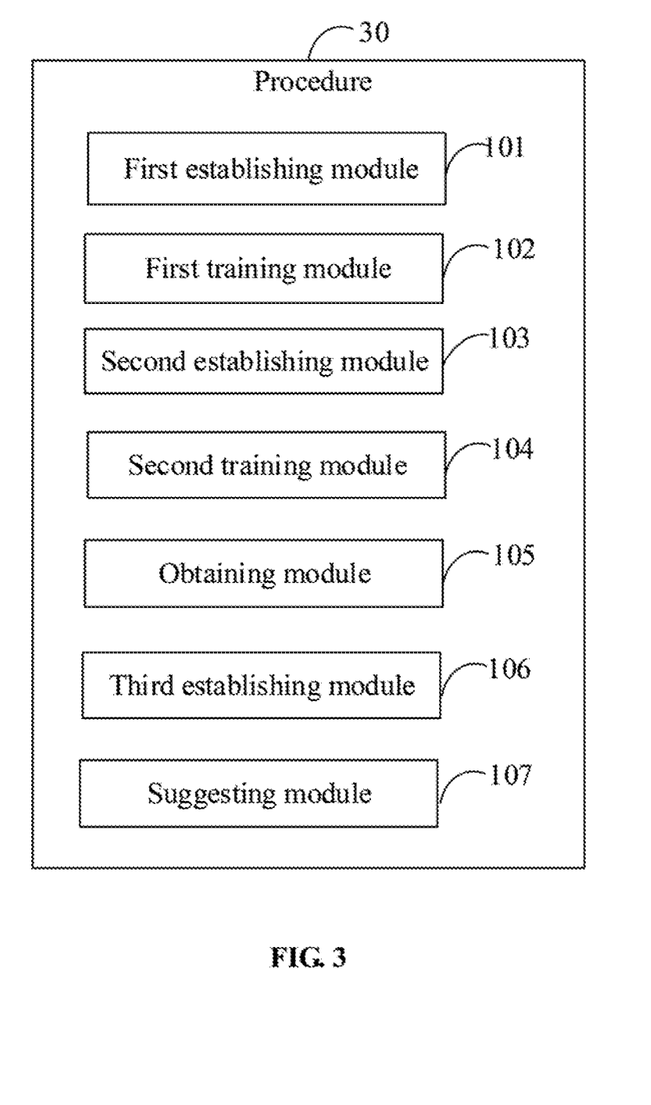
FIG. 3 is a block diagram of an embodiment of a procedure for deciding product printing parameters of the device of FIG. 2.

FIG. 3 illustrates the procedure 30 as comprising a plurality of modules, such as a first establishing module 101, a first training module 102, a second establishing module 103, a second training module 104, an obtaining module 105, a third establishing module 106, and a suggesting module 107. The modules 101-107 may comprise one or more software programs in the form of computerized codes stored in the data storage 10. The computerized codes may include commands that can be executed by the processor 20 to provide functions for the modules 101-107.

The first establishing module 101 establishes a solder-printing database of a predetermined product.

In one embodiment, the predetermined product may be a PCB with a predetermined size. The first establishing module 101 may establish the solder-printing database by collecting multiple experimental printing parameters of the predetermined product and measuring parameters of the SPI 300 corresponding to the multiple experimental printing parameters. The solder-printing database comprises a plurality of printing sample data, and each printing sample data comprises an experimental printing parameter of the SPSP 200 for producing by trial-and-error the predetermined product and a measuring response (measuring parameter) of the SPI 300 corresponding to the experimental printing parameter.

In one embodiment, the printing parameter of the SPSP 200 can comprise pressure of solder-applying blade, printing speed, demolding speed, demolding distance, etc. The measuring parameter of the SPI 300 can comprise a height of the applied solder, an area of the applied solder, a volume of the solder paste applied, etc.

The first training module 102 trains a first prediction model of the predetermined product between the printing parameters of the SPSP 200 and the measuring responses of the SPI 300 based on the solder-printing database.

In one embodiment, when the solder-printing database is established, the first training module 102 can establish and train the first prediction model of the predetermined product based on the solder-printing database.

In one embodiment, the first training module 102 can randomly divide the plurality of printing sample data into a training set and a test set. An amount of data of the training set is greater than an amount of data of the test set. For example, eighty percent of the solder-printing sample data is in the training set, and twenty percent is in the test set. The first training module 102 trains a predetermined network model through the training set to obtain a first intermediate model, and tests the first intermediate model through the test set. When a testing of the first intermediate model meets a predetermined standard, the first training module 102 can stop training the first prediction model and define the first intermediate model as the first prediction model.

In one embodiment, the predetermined model can be a network model. For example, the predetermined model can be a convolutional neural network (CNN) model or a recurrent neural network (RNN) model. When the first intermediate model is trained by the first training module 102 through the training set, each test data of the test set can be inputted to the first intermediate model to obtain a result of testing. The first training module 102 can count a rate of precision of the first intermediate model according to testing results of the test set. When the precision rate of the first intermediate model meets the predetermined standard, it indicates that the first intermediate model meets the requirements of the model. The first training module 102 can define the first intermediate model as the first prediction model.

In one embodiment, the predetermined standard may be a predetermined threshold (for example, ninety-five percent). When the precision rate of the first intermediate model is greater than the predetermined threshold, then the first intermediate model meets the requirements of the model.

For example, each test data of the test set is inputted to the first prediction model to predict a measuring parameter of the SPI 300. If a difference between the measuring parameter predicted by the first prediction model and the measuring parameter comprised in the test data is within a predetermined range (for example, within ten percent), the testing result of the test data is defined as satisfactory and passing. If the difference between the measuring parameter predicted by the first prediction model and the measuring parameter comprised in the test data is not within the predetermined range, the testing result of the test data is defined as failure. The predetermined range can be defined according to a practical application.

When the precision rate of the first intermediate model does not meet the predetermined standard, the first intermediate model is deemed not to meet the requirements of the model. The first training module 102 can adjust the training parameters of the predetermined network model and retrain the adjusted predetermined network model through the training set to obtain a second intermediate model. The first training module 102 further tests the second intermediate model through the test set to obtain a precision rate. When the precision rate of the second intermediate model meets the predetermined standard, the second intermediate model is deemed able to meet the requirement of the model. The first training module 102 can define the second intermediate model as the first prediction model. When the precision rate of the second intermediate model still does not meet the predetermined standard, the first training module 102 can perform repeated adjustment steps of model parameters until a result of testing of retrained intermediate model meets the predetermined standard.

In one embodiment, the training parameters of the predetermined model can comprise a total number of layers, a number of neurons in each layer, and a model complexity. For example, the predetermined model is a neural network model, the adjusting of training parameters can comprise: adjusting the total number of layers of the neural network model and/or a number of neurons in each layer of the neural network model. The predetermined model is a machine learning model, the adjusting of training parameters can comprise: adjusting the model complexity of the machine learning model.

The second establishing module 103 establishes a product database of different specifications.

In one embodiment, the second establishing module 103 can establish the product database of different specifications by collecting specification data and measurement data of printed circuit boards (PCBs) of different specifications. The product database may comprise product sizes of the PCBs, printing parameters of the SPSP 200, measuring parameters of the SPI 300, and aperture sizes of stencils. The PCBs of different specifications can be PCBs with different sizes and/or PCBs with different stencil apertures.

The second training module 104 trains a second prediction model between product specifications and measuring parameters of the SPI 300 based on the product database of different specifications.

In one embodiment, when the product database of different specifications is established, the second training module 104 can establish and train the second prediction model based on the product database of different specifications. The second prediction model can predict an influence of the product specification on the measuring parameter of the SPI 300. For example, with regard to the same printing parameters, products of different specifications may obtain different measuring parameters of the SPI 300. Based on the different measuring parameters of the SPI 300, it is possible to predict an influence of the specification of the product in affecting the measuring parameters of the SPI 300.

In one embodiment, the second prediction model can be trained by referring to a training method of the first prediction model as mentioned above. The second training module 104 can update the second prediction model by adding printing sample data of products of different specifications.

The obtaining module 105 obtains predicted measurements of the SPI 300 of products with different specifications under multiple sets of printing parameters based on the first prediction model and the second prediction model.

In one embodiment, when the first prediction model and the second prediction model are obtained, the obtaining module 105 can obtain the predicted measurements of the SPI 300 of the products with different specification under multiple sets of printing parameters based on the first prediction model and the second prediction model.

In one embodiment, the obtaining module 105 can estimate a specification influence of each of the products with different specifications based on the second prediction model, and obtain the predicted measurements of the SPI 300 of the products with different specification under the multiple sets of printing parameters based on the first prediction model and the specification influences of the products with different specifications.

The third establishing module 106 establishes an objective function based on the predicted measurements of the SPI 300 of the products with different specifications.

In one embodiment, when the predicted measurements of the SPI 300 of the products with different specification under the multiple sets of printing parameters are obtained, the third establishing module 106 can establish the objective function based on the predicted measurements of the SPI 300 of the products with different specification. The objective function can remove the influence of the product specification of a product to predict the measuring parameter of the SPI 300 of the product under a specified printing parameter of the SPSP 200.

The suggesting module 107 inputs a product specification of an objective product (product specified by the user) and an expectation measuring parameter of the SPI 300 to the objective function to output a printing-suggestion parameter corresponding to the objective product.

In one embodiment, when the objective function is established, a printing parameter corresponding to an expectation measuring parameter of the SPI 300 defined by a user for the objective product can be determined according to the objective function, and then the printing parameter is defined as the printing-suggestion parameter for print the objective product.

In one embodiment, the suggesting module 107 can input the product specifications of the objective product and the expectation measuring parameter into the objective function, and the printing-suggestion parameter corresponding to the objective product can be obtained through the objective function. Then the user can obtain an actual measuring parameter of the SPI 300 of the objective product under the printing-suggestion parameter and adjust the printing-suggestion parameter according to a predetermined micro-adjustment method and the actual measuring parameter, and the trial and error process for deciding the printing parameter can be reduced.

For example, the objective product is a PCB with a length of 401.4 mm, a width of 80.1 mm, and a thickness of 2.39 mm. When the length, the width, and the thickness of the objective product and the expectation measuring parameter are input to the objective function, the suggesting module 107 can output the printing-suggestion parameter corresponding to the objective product, and the user can perform trial and error according to the printing-suggestion parameter, which can reduce the trial and error process and the NPI import time.

In one embodiment, when the printing-suggestion parameter corresponding to the objective product is obtained, an actual measuring parameter of the SPI 300 of the objective product under the printing-suggestion parameter can be obtained, and the suggesting module 107 can further determine whether a difference value between the actual measuring parameter and the expectation measuring parameter of the objective product is within a predetermined range. If the difference value between the actual measuring parameter and the expectation measuring parameter of the objective product is not within the predetermined range, the printing-suggestion parameter is adjusted according to the predetermined micro-adjustment method, and the obtaining step of the measuring parameter and the determining step of the different value are repeated until the difference value between a measuring parameter detected again and the expectation measuring parameter is within the predetermined range. The predetermined range may be defined according to a practical requirement, for example, the predetermined range may be a difference range of five percent. The predetermined micro-adjustment method may also be defined according to a practical requirement, for example, adjusting values of a sub-parameter of the printing parameter in steps.

Figure 4:
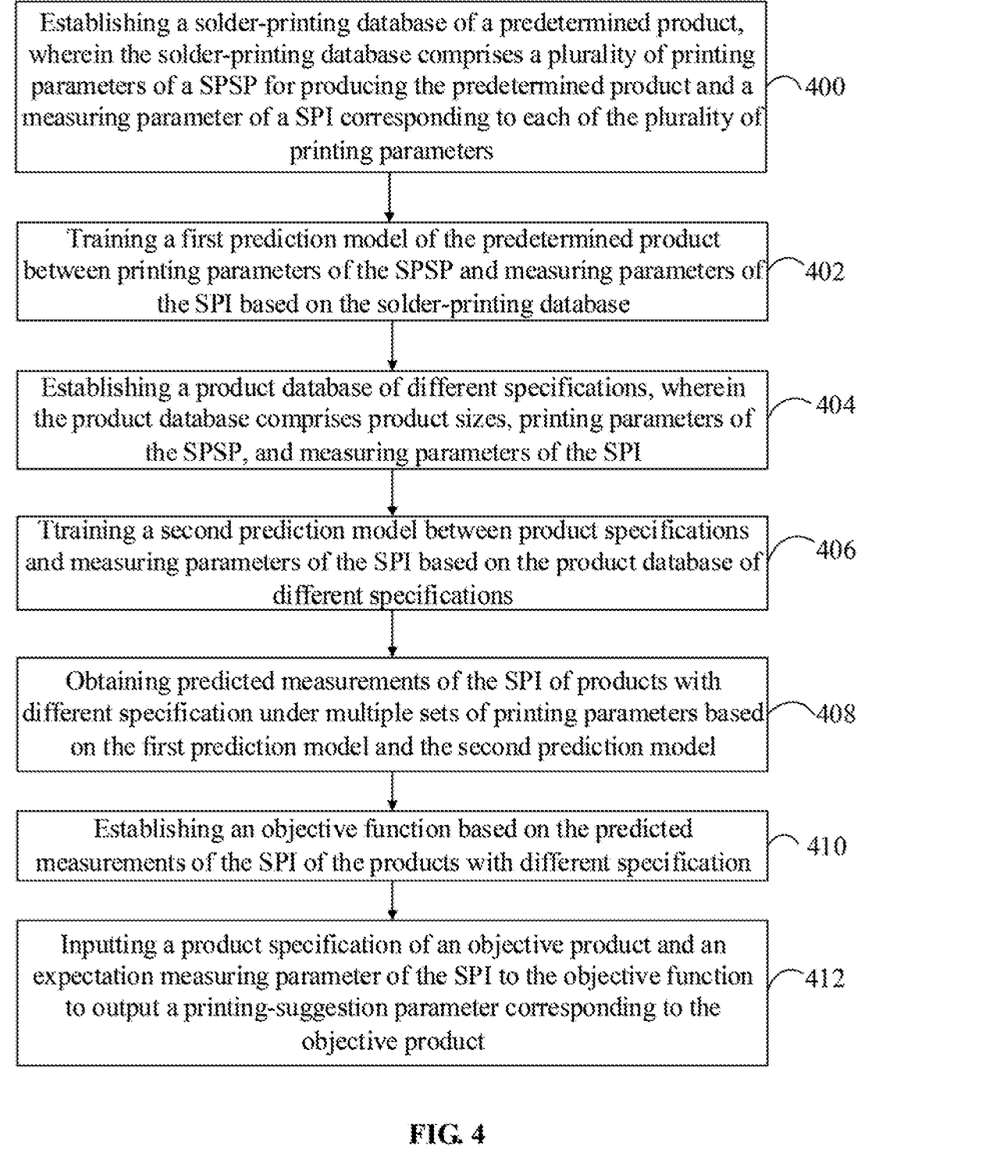
FIG. 4 is a flow diagram of an embodiment of a method for deciding product printing parameters utilized in the device of FIG. 2.

FIG. 4 illustrates one exemplary embodiment of a method for deciding PCB printing parameters for a PCB. The flowchart presents an exemplary embodiment of the method. The exemplary method is provided by way of example, as there are a variety of ways to carry out the method. The method described below can be carried out using the configurations illustrated in FIG. 3, for example, and various elements of these figures are referenced in explaining the example method. Each block shown in FIG. 4 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 400.

In block 400, a solder-printing database of a predetermined product is established.

In one embodiment, the predetermined product may be a PCB with a predetermined size. The solder-printing database can be established by collecting multiple experimental printing parameters of the predetermined product and measuring parameters of the SPI 300 corresponding to the multiple experimental printing parameters. The solder-printing database comprises a plurality of printing sample data, and each printing sample data comprises an experimental printing parameter of the SPSP 200 for producing by trial-and-error the predetermined product and a measuring parameter of the SPI 300 corresponding to the experimental printing parameter.

In one embodiment, the printing parameter of the SPSP 200 can comprise pressure of solder-applying blade, printing speed, demolding speed, demolding distance, etc. The measuring parameter of the SPI 300 can comprise a height of the applied solder, an area of the applied solder, a volume of the solder applied, etc.

In block 402, a first prediction model of the predetermined product between the printing parameters of the SPSP 200 and the measuring responses of the SPI 300 is trained based on the solder-printing database.

In one embodiment, when the solder-printing database is established, the first prediction model of the predetermined product can be established and trained based on the solder-printing database.

In one embodiment, the plurality of printing sample data can be randomly divided into a training set and a test set. An amount of data of the training set is greater than an amount of data of the test set. For example, eighty percent of the solder-printing sample data is in the training set, and twenty percent is in the test set. A predetermined network model is trained through the training set to obtain a first intermediate model, and the first intermediate model is tested through the test set. When a testing of the first intermediate model meets a predetermined standard, the training of the first prediction model can be stopped and the first intermediate model can be defined as the first prediction model.

In one embodiment, the predetermined model can be a network model. For example, the predetermined model can be a CNN model or a RNN model. When the first intermediate model is trained through the training set, each test data of the test set can be inputted to the first intermediate model to obtain a result of testing. A rate of precision of the first intermediate model can be counted according to a testing results of the test set. When the precision rate of the first intermediate model meets the predetermined standard, it indicates that the first intermediate model meets the requirements of the model, and the first intermediate model can be defined as the first prediction model.

In one embodiment, the predetermined standard may be a predetermined threshold (for example, ninety-five percent). When the precision rate of the first intermediate model is greater than the predetermined threshold, then the first intermediate model meets the requirements of the model.

For example, each test data of the test set is inputted to the first prediction model to predict a measuring parameter of the SPI 300. If a difference between the measuring parameter predicted by the first prediction model and the measuring parameter comprised in the test data is within a predetermined range (for example, within ten percent), the testing result of the test data is defined as satisfactory and passing. If the difference between the measuring parameter predicted by the first prediction model and the measuring parameter comprised in the test data is not within the predetermined range, the testing result of the test data is defined as failure. The predetermined range can be defined according to a practical application.

When the precision rate of the first intermediate model does not meet the predetermined standard, the first intermediate model is deemed not to meet the requirements of the model. Training parameters of the predetermined network model can be adjusted, and the predetermined network model after adjustment is retrained through the training set to obtain a second intermediate model. The second intermediate model is tested through the test set to obtain a precision rate. When the precision rate of the second intermediate model meets the predetermined standard, the second intermediate model is deemed able to meet the requirement of the model. The second intermediate model can be defined as the first prediction model. When the precision rate of the second intermediate model still does not meet the predetermined standard, a repeated adjustment step of model parameters is performed until a result of testing of the retrained intermediate model meets the predetermined standard.

In one embodiment, the training parameters of the predetermined model can comprise a total number of layers, a number of neurons in each layer, and a model complexity. For example, the predetermined model is a neural network model, the adjusting of training parameters can comprise: adjusting the total number of layers of the neural network model and/or a number of neurons in each layer of the neural network model. The predetermined model is a machine learning model, the adjusting of training parameters can comprise: adjusting the model complexity of the machine learning model.

In block 404, a product database of different specifications is established.

In one embodiment, the product database of different specifications can be established by collecting specification data and measurement data of PCBs of different specifications. The product database may comprise product sizes of the PCBs, printing parameters of the SPSP 200, measuring parameters of the SPI 300, and aperture sizes of stencils. The PCBs of different specifications can be PCBs with different sizes and/or PCBs with different stencil apertures.

In block 406, a second prediction model between product specifications and measuring parameters of the SPI 300 is trained based on the product database of different specifications.

In one embodiment, when the product database of different specifications is established, the second prediction model can be established and trained based on the product database of different specifications. An influence of the product specification on the measuring parameter of the SPI 300 can be predicted. For example, with regard to the same printing parameters, products of different specifications may obtain different measuring parameter of the SPI 300. Based on the different measuring parameter of the SPI 300, it is possible to predict an influence of the specification of the product in affecting the measuring parameters of the SPI 300.

In one embodiment, the second prediction model can be trained by referring to a training method of the first prediction model as mentioned above. The second training module 104 can update the second prediction model by adding printing sample data of products of different specifications.

In block 408, predicted measurements of the SPI 300 of products with different specification under multiple sets of printing parameters are obtained based on the first prediction model and the second prediction model.

In one embodiment, when the first prediction model and the second prediction model are obtained, the predicted measurements of the SPI 300 of the products with different specification under multiple sets of printing parameters can be obtained based on the first prediction model and the second prediction model.

In one embodiment, a specification influence of each of the products with different specifications can be estimated based on the second prediction model, and the predicted measurements of the SPI 300 of the products with different specification under the multiple sets of printing parameters can be obtained based on the first prediction model and the specification influences of the products with different specifications.

In block 410, an objective function is established based on the predicted measurements of the SPI 300 of the products with different specifications.

In one embodiment, when the predicted measurements of the SPI 300 of the products with different specification under the multiple sets of printing parameters are obtained, the objective function can be established based on the predicted measurements of the SPI 300 of the products with different specifications. The objective function can remove the influence of the product specification of a product to predict the measuring parameter of the SPI 300 of the product under a specified printing parameter of the SPSP 200.

In block 412, a product specification of an objective product and an expectation measuring parameter of the SPI 300 are inputted to the objective function to output a printing-suggestion parameter corresponding to the objective product.

In one embodiment, when the objective function is established, a printing parameter corresponding to an expectation measuring parameter of the SPI 300 defined by a user for the objective product can be determined according to the objective function, and then the printing parameter is defined as the printing-suggestion parameter for print the objective product.

In one embodiment, the product specifications of the objective product and the expectation measuring parameter can be inputted into the objective function, and the printing-suggestion parameter corresponding to the objective product can be obtained through the objective function. Then the user can obtain an actual measuring parameter of the SPI 300 of the objective product under the printing-suggestion parameter and adjust the printing-suggestion parameter according to a predetermined micro-adjustment method and the actual measuring parameter, and the trial and error process for deciding the printing parameter can be reduced.

For example, the objective product is a PCB with a length of 401.4 mm, a width of 80.1 mm, and a thickness of 2.39 mm. When the length, the width, and the thickness of the objective product and the expectation measuring parameter are inputted into the objective function, the printing-suggestion parameter corresponding to the objective product can be outputted by the objective function, and the user can perform trial and error according to the printing-suggestion parameter, which can reduce the trial and error process and the NPI import time.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method for deciding product printing parameters, the method comprising:
    establishing a solder-printing database of a predetermined product, wherein the solder-printing database comprises a plurality of printing parameters of a solder paste screen printer (SPSP) for producing the predetermined product and a measuring parameter of a solder paste inspection (SPI) corresponding to each of the plurality of printing parameters;
    training a first prediction model of the predetermined product between printing parameters of the SPSP and measuring parameters of the SPI based on the solder-printing database;
    establishing a product database of different product specifications, wherein the product database comprises product sizes, printing parameters of the SPSP, and measuring parameters of the SPI;
    training a second prediction model between product specifications and measuring parameters of the SPI based on the product database of different product specifications;
    estimating specification influences of products with different product specifications based on the second prediction model;
    obtaining predicted measurements of the SPI of the products with different product specifications under multiple sets of printing parameters based on the first prediction model and the specification influences of the products with different product specifications;
    establishing an objective function based on the predicted measurements of the SPI of the products with different product specifications; and
    inputting a product specification of an objective product and an expectation measuring parameter of the SPI to the objective function to output a printing-suggestion parameter corresponding to the objective product.

2. The method of claim 1, wherein the printing parameter comprises a pressure of solder-applying blade, printing speed, demolding speed, and demolding distance; and the measuring parameter comprises a height of applied solder, an area of applied solder, and a volume of solder applied.

3. The method of claim 1, wherein the product database further comprises aperture sizes of stencils.

4. The method of claim 1, the method of training the first prediction model of the predetermined product between the printing parameters of the SPSP and the measuring parameters of the SPI based on the solder-printing database comprising:
    dividing data of the solder-printing database into a training set and a test set, wherein an amount of data of the training set is greater than an amount of data of the test set;
    training the first prediction model through the training set and testing the first prediction model through the test set; and
    stopping to train the first prediction model if a testing of the first prediction meets a predetermined standard.

5. The method of claim 4, further comprising:
    adjusting training parameters of the first prediction model if the testing of the first prediction model does not meet the predetermined standard;
    retraining adjusted first prediction model through the training set and testing the adjusted first prediction model through the test set; and
    stopping to train the adjusted first prediction model if a testing of the adjusted first prediction meets the predetermined standard; and
    repeating the adjusting step of the training parameters and the retraining step if the testing of the adjusted first prediction does not meet the predetermined standard.

6. The method of claim 1, further comprising:
    obtaining an actual measuring parameter of the SPI of the objective product under the printing-suggestion parameter;
    determining whether a difference value between the actual measuring parameter of SPI and the expectation measuring parameter of the SPI of the objective product is within a predetermined range; and
    adjusting the printing-suggestion parameter according to a predetermined micro-adjustment method and repeating the obtaining step and the determining step if the difference value between the actual measuring parameter of SPI and the expectation measuring parameter of the SPI of the objective product is not within the predetermined range.

7. A device for deciding product printing parameters, the device comprising:
    at least one processor; and
    a storage device storing one or more programs which when executed by the at least one processor, causes the at least one processor to:
        establish a solder-printing database of a predetermined product, wherein the solder-printing database comprises a plurality of printing parameters of an SPSP for producing the predetermined product and a measuring parameter of an SPI corresponding to each of the plurality of printing parameters;

train a first prediction model of the predetermined product between printing parameters of the SPSP and measuring parameters of the SPI based on the solder-printing database;

establish a product database of different product specifications, wherein the product database comprises product sizes, printing parameters of the SPSP, and measuring parameters of the SPI;

train a second prediction model between product specifications and measuring parameters of the SPI based on the product database of different product specifications;

estimate specification influences of products with different product specifications based on the second prediction model;

obtain predicted measurements of the SPI of the products with different product specifications under multiple sets of printing parameters based on the first prediction model and the specification influences of the products with different product specifications;

establish an objective function based on the predicted measurements of the SPI of the products with different product specifications; and input a product specification of an objective product and an expectation measuring parameter of the SPI to the objective function to output a printing-suggestion parameter corresponding to the objective product.

8. The device of claim 7, wherein the printing parameter comprises a pressure of solder-applying blade, printing speed, demolding speed, and demolding distance; and the measuring parameter comprises a height of applied solder, an area of applied solder, and a volume of solder paste applied.

9. The device of claim 7, wherein the product database further comprises aperture sizes of stencils.

10. The device of claim 7, wherein the at least one processor to train the first prediction model of the predetermined product between the printing parameters of the SPSP and the measuring parameters of the SPI based on the solder-printing database comprises:

divide data of the solder-printing database into a training set and a test set, wherein an amount of data of the training set is greater than an amount of data of the test set;

train the first prediction model through the training set and test the first prediction model through the test set; and stop to train the first prediction model if a testing of the first prediction meets a predetermined standard.

11. The device of claim 10, wherein the at least one processor is further to:

adjust training parameters of the first prediction model if the testing of the first prediction model does not meet the predetermined standard;

retrain adjusted first prediction model through the training set and test the adjusted first prediction model through the test set; and stop to train the adjusted first prediction model if a testing of the adjusted first prediction meets the predetermined standard; and repeat the adjusting step of the training parameters and the retraining step if the testing of the adjusted first prediction does not meet the predetermined standard.

12. The device of claim 7, wherein the at least one processor is further to:

obtain an actual measuring parameter of the SPI of the objective product under the printing-suggestion parameter;

determine whether a difference value between the actual measuring parameter of SPI and the expectation measuring parameter of the SPI of the objective product is within a predetermined range; and adjust the printing-suggestion parameter according to a predetermined micro-adjustment method and repeat the obtaining step and the determining step if the difference value between the actual measuring parameter of SPI and the expectation measuring parameter of the SPI of the objective product is not within the predetermined range.

13. A non-transitory storage medium having stored thereon commands that, when executed by a processor of a device, causes the device to perform a method for deciding product printing parameters, the method comprising:

establishing a solder-printing database of a predetermined product, wherein the solder-printing database comprises a plurality of printing parameters of an SPSP for producing the predetermined product and a measuring parameter of an SPI corresponding to each of the plurality of printing parameters;

training a first prediction model of the predetermined product between printing parameters of the SPSP and measuring parameters of the SPI based on the solder-printing database;

establishing a product database of different product specifications, wherein the product database comprises product sizes, printing parameters of the SPSP, and measuring parameters of the SPI;

training a second prediction model between product specifications and measuring parameters of the SPI based on the product database of different product specifications;

estimating specification influences of products with different product specifications based on the second prediction model;

obtaining predicted measurements of the SPI of the products with different product specifications under multiple sets of printing parameters based on the first prediction model and the specification influences of the products with different product specifications;

establishing an objective function based on the predicted measurements of the SPI of the products with different product specifications; and inputting a product specification of an objective product and an expectation measuring parameter of the SPI to the objective function to output a printing-suggestion parameter corresponding to the objective product.

14. The non-transitory storage medium of claim 13, wherein the printing parameter comprises a pressure of solder-applying blade, printing speed, demolding speed, and demolding distance; and the measuring parameter comprises a height of applied solder, an area of applied solder, and a volume of solder paste applied.

15. The non-transitory storage medium of claim 13, wherein the product database further comprises aperture sizes of a stencil.

16. The non-transitory storage medium of claim 13, wherein the method further comprises:

obtaining an actual measuring parameter of the SPI of the objective product under the printing-suggestion parameter;

determining whether a difference value between the actual measuring parameter of SPI and the expectation measuring parameter of the SPI of the objective product is within a predetermined range; and adjusting the printing-suggestion parameter according to a predetermined micro-adjustment method and repeating the obtaining step and the determining step if the difference value between the actual measuring parameter of SPI and the expectation measuring parameter of the SPI of the objective product is not within the predetermined range.

* * * * *